(12) United States Patent
Jeong et al.

(10) Patent No.: US 12,355,314 B2
(45) Date of Patent: Jul. 8, 2025

(54) POWER CONVERTER FOR INTEGRATED CONTROL OF ELECTRIC OIL PUMPS

(71) Applicant: Hyundai Transys Inc., Chungcheongnam-do (KR)

(72) Inventors: Hee Cheon Jeong, Gyeonggi-do (KR); Oh Joong Kwon, Gyeonggi-do (KR); Dae Kyun Kim, Gyeonggi-do (KR); Chang Kyo Jung, Gyeonggi-do (KR); Yeon Ho Kim, Gyeonggi-do (KR)

(73) Assignee: Hyundai Transys Inc., Seosan-si (KR)

( * ) Notice: Subject to any disclaimer, the term of this patent is extended or adjusted under 35 U.S.C. 154(b) by 303 days.

(21) Appl. No.: 18/251,008

(22) PCT Filed: Nov. 11, 2021

(86) PCT No.: PCT/KR2021/016456
§ 371 (c)(1),
(2) Date: Apr. 28, 2023

(87) PCT Pub. No.: WO2022/119169
PCT Pub. Date: Jun. 9, 2022

(65) Prior Publication Data
US 2023/0384805 A1    Nov. 30, 2023

(30) Foreign Application Priority Data

Dec. 4, 2020  (KR) .................. 10-2020-0168696

(51) Int. Cl.
*H02K 11/33* (2016.01)
*H02K 7/14* (2006.01)
(Continued)

(52) U.S. Cl.
CPC .............. *H02K 11/33* (2016.01); *H02K 7/14* (2013.01); *H02K 11/30* (2016.01); *H02M 7/003* (2013.01); *G05D 7/0617* (2013.01)

(58) Field of Classification Search
CPC .......... H02K 11/30; H02K 11/33; H02K 7/14; H02K 5/136; G05D 7/0617; H02M 7/003
(Continued)

(56) References Cited

U.S. PATENT DOCUMENTS

| 2013/0166126 | A1 | 6/2013 | Miyamoto et al. | |
| 2014/0330489 | A1* | 11/2014 | Sakamoto | E02F 9/2075 |
| | | | | 701/50 |
| 2016/0185232 | A1* | 6/2016 | Suzuki | B60L 50/16 |
| | | | | 903/945 |

FOREIGN PATENT DOCUMENTS

| CN | 102161370 A | 8/2011 |
| CN | 108327541 A | 7/2018 |

(Continued)

OTHER PUBLICATIONS

International Search Report, dated Feb. 23, 2022, in PCT Application No. PCT/KR2021/016456.
(Continued)

*Primary Examiner* — Alexander A Singh
(74) *Attorney, Agent, or Firm* — SALIWANCHIK, LLOYD & EISENSCHENK

(57) ABSTRACT

Disclosed herein is a power converter for integrated control of electric oil pumps, which includes a power conversion module configured to receive a direct current voltage to convert the same into an alternating current voltage and to output the converted alternating current voltage to a drive motor, and a control unit configured to control the power conversion module and to control actuation of an oil pump for generating hydraulic pressure in a transmission. The control unit includes a control board, a main controller installed in a partial region of the control board to supply power to the drive motor and to control the power conversion module, and an oil pump controller installed in a remaining region other than the partial region, connected to
(Continued)

the main controller, and configured to supply power to a pump motor for actuating the oil pump and to control the oil pump.

6 Claims, 7 Drawing Sheets

(51) Int. Cl.
*H02K 11/30* (2016.01)
*H02M 7/00* (2006.01)
*G05D 7/06* (2006.01)

(58) Field of Classification Search
USPC ........................................................ 310/68 R
See application file for complete search history.

(56) References Cited

FOREIGN PATENT DOCUMENTS

| CN | 111865105 A | 10/2020 |
|----|---|---|
| JP | 2020178481 A | 10/2020 |
| KR | 20110028888 A | 3/2011 |
| KR | 20130032116 A | 4/2013 |
| KR | 20150135784 A | 12/2015 |
| KR | 20200121416 A | 10/2020 |

OTHER PUBLICATIONS

Office Action dated Apr. 26, 2025 in Chinese Application No. 202180081276.5 (with English translation).

* cited by examiner

POWER CONVERTER FOR INTEGRATED CONTROL OF ELECTRIC OIL PUMPS

CROSS-REFERENCE TO RELATED APPLICATIONS

This application is the U.S. national stage application of International Patent Application No. PCT/KR2021/016456, filed Nov. 11, 2021, which claims the benefit under 35 U.S.C. § 119 of Korean Application No. 10-2020-0168696, filed Dec. 4, 2020, the disclosures of each of which are incorporated herein by reference in their entirety.

TECHNICAL FIELD

Exemplary embodiments of the present disclosure relate to a power converter for integrated control of electric oil pumps, and more particularly, to a power converter for integrated control of electric oil pumps, which allows an electric oil pump to have an improved degree of freedom in package.

BACKGROUND ART

In general, electric oil pumps (EOPs) generate hydraulic pressure to allow an automatic transmission lubrication and hydraulic system to operate continuously in the range of vehicle speed and torque where engine power is not involved in hybrid vehicles.

FIG. 1 is a perspective view illustrating a conventional electric oil pump. Referring to FIG. 1, the conventional electric oil pump, which is designated by reference numeral 1, may include a pump part 2, a motor part 3, and a controller 4 that controls the actuation of the pump part 2 and the motor part 3. The conventional electric oil pump 1 is mounted outside a transmission.

Since the controller 4 provided in the conventional electric oil pump 1 includes a housing, a control board, and control elements, the oil pump occupies an absolutely large area. Hence, when the oil pump is mounted outside the transmission, the packageability of the transmission and the vehicle may be degraded due to the size of the controller 4.

The related art of the present disclosure is disclosed in Korean Patent Application Publication No. 2013-0065144 (published on Jun. 19, 2013, entitled "ELECTRIC OIL PUMP FOR HYBRID VEHICLE").

DISCLOSURE

Technical Problem

Various embodiments are directed to a power converter for integrated control of electric oil pumps, which allows an electric oil pump to have an increased degree of freedom in package by integrating an oil pump controller for the electric oil pump into a control unit of the power converter.

Various embodiments are also directed to a power converter for integrated control of electric oil pumps, which is capable of eliminating components required to mount an oil pump controller to reduce the number of components, thereby achieving a reduction in cost and weight.

Technical Solution

In an embodiment, there is provided a power converter for integrated control of electric oil pumps, which includes a power conversion module configured to receive direct current (DC) power to convert the DC power into alternating current (AC) power and to output the converted AC power to a drive motor, and a control unit configured to control the power conversion module and to control actuation of an oil pump for generating hydraulic pressure in a transmission. The control unit includes a control board, a main controller installed in a partial region of the control board to supply power to the drive motor and to control the power conversion module, and an oil pump controller installed in a remaining region other than the partial region, connected to the main controller, and configured to supply power to a pump motor for actuating the oil pump and to control the oil pump.

The oil pump controller may include an input bus bar electrically connected to the main controller and installed on the control board to receive DC power from a power source, and an output connector installed on the control board to output AC power to the pump motor. When in the control board, the region where the main controller is installed is referred to as a first region and the region where the oil pump controller is installed is referred to as a second region, the input bus bar and the output connector may be installed in the second region.

The second region may be a region including at least a portion of an edge of the control board.

The control unit may further include an insulator formed between the first region and the second region of the control board to form a separation distance between the main controller and the oil pump controller.

The insulator may include a plurality of insulation holes formed between the main controller and the oil pump controller and elongated along a boundary between the first region and the second region.

The insulator may include an insulation barrier protruding between the main controller and the oil pump controller and having a predetermined thickness.

Advantageous Effects

According to the embodiments of the present disclosure, integrating an oil pump controller for an electric oil pump into a control unit of a power converter can increase the degree of freedom in package of the electric oil pump.

In addition, according to the embodiments of the present disclosure, it is possible to reduce the number of components by eliminating the components required to mount the oil pump controller, and thus to achieve a reduction in cost and weight.

Moreover, according to the embodiments of the present disclosure, the output of a pump motor is directly controlled by the control unit of the power converter, which can increase the precision of control, and the power converter utilizes a water-cooled cooling system, which can improve the cooling efficiency of an oil pump.

Furthermore, the control unit according to the embodiments of the present disclosure includes an insulator formed on a control board, which allows an insulation distance to be ensured between the region where the main controller is formed and the region where the oil pump controller is formed.

BEST MODE

Hereinafter, exemplary embodiments of the present disclosure will be described in detail with reference to the accompanying drawings.

The embodiments described below are suitable for understanding the technical features of a power converter for integrated control of electric oil pumps according to the present disclosure. However, it will be understood by those skilled in the art that the present disclosure or the technical features thereof are not limited to the embodiments described below. It will be apparent to those skilled in the art that various modifications and other equivalent embodiments may be made without departing from the technical scope of the present disclosure.

Figure 1:
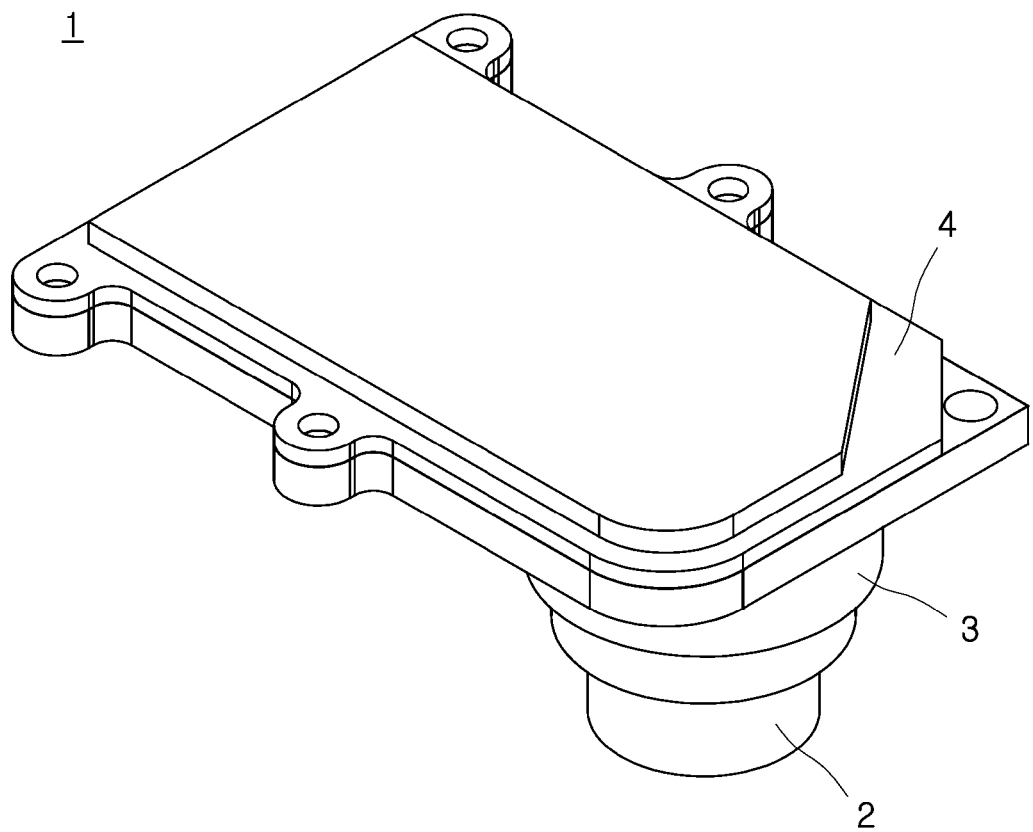
FIG. 1 is a perspective view illustrating a conventional electric oil pump.
Figure 2:
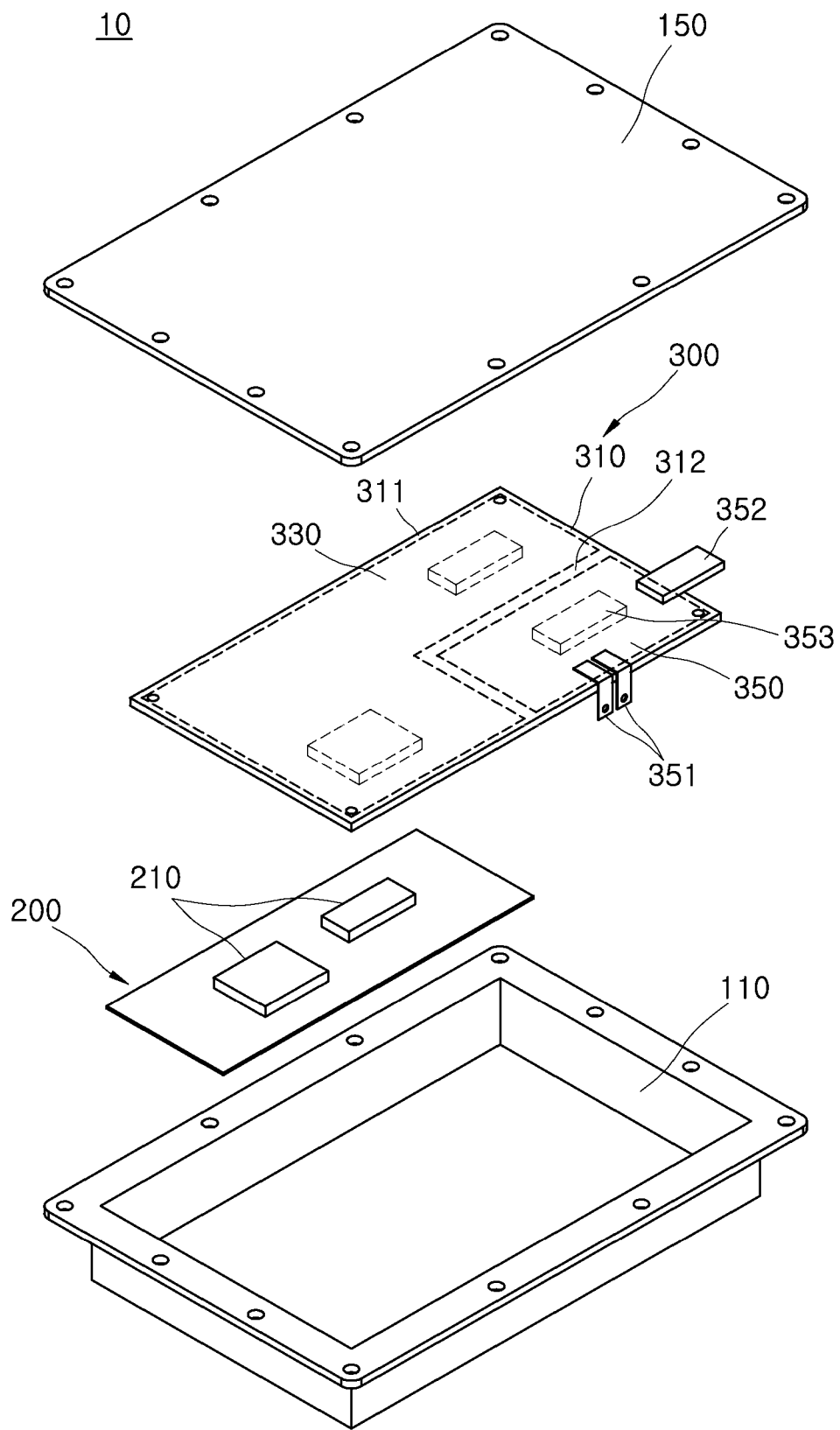
FIG. 2 is an exploded perspective view illustrating a power converter for integrated control of electric oil pumps according to an embodiment of the present disclosure.
Figure 3:
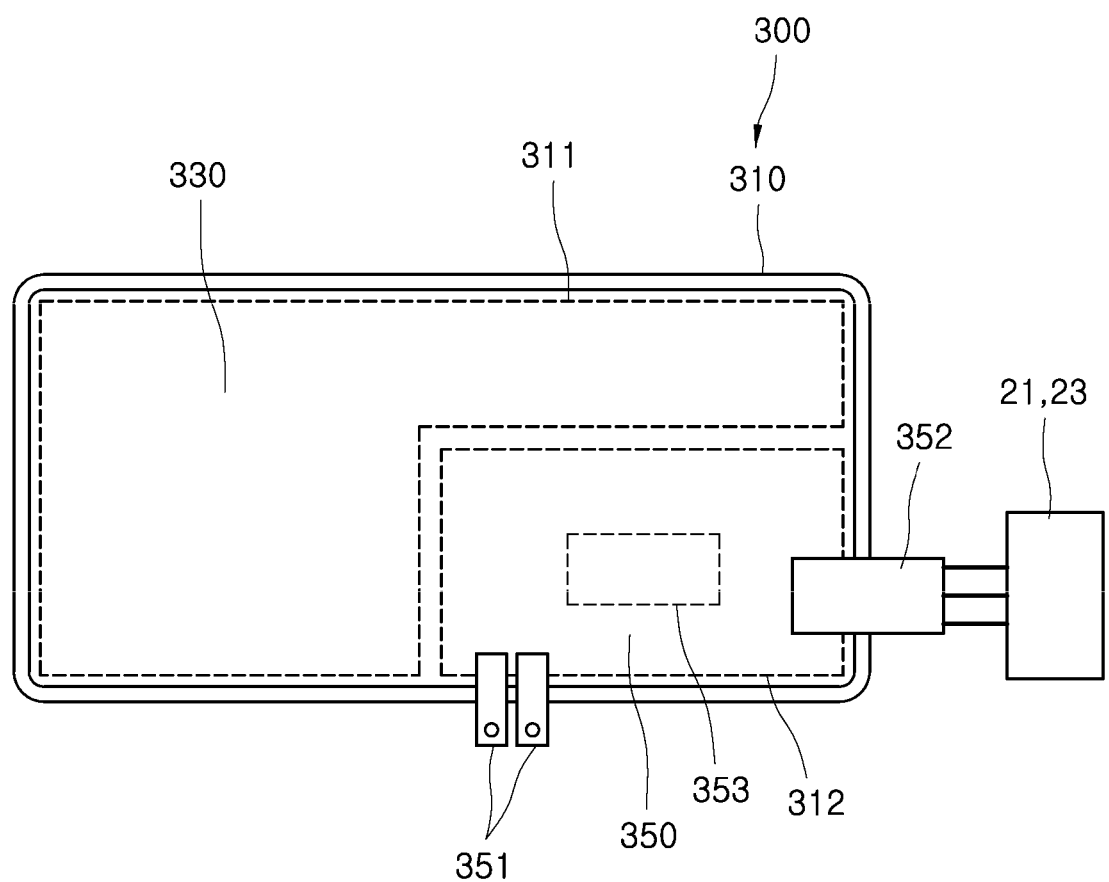
FIG. 3 is a view schematically illustrating a configuration of a control unit according to the embodiment of the present disclosure.
Figure 4:
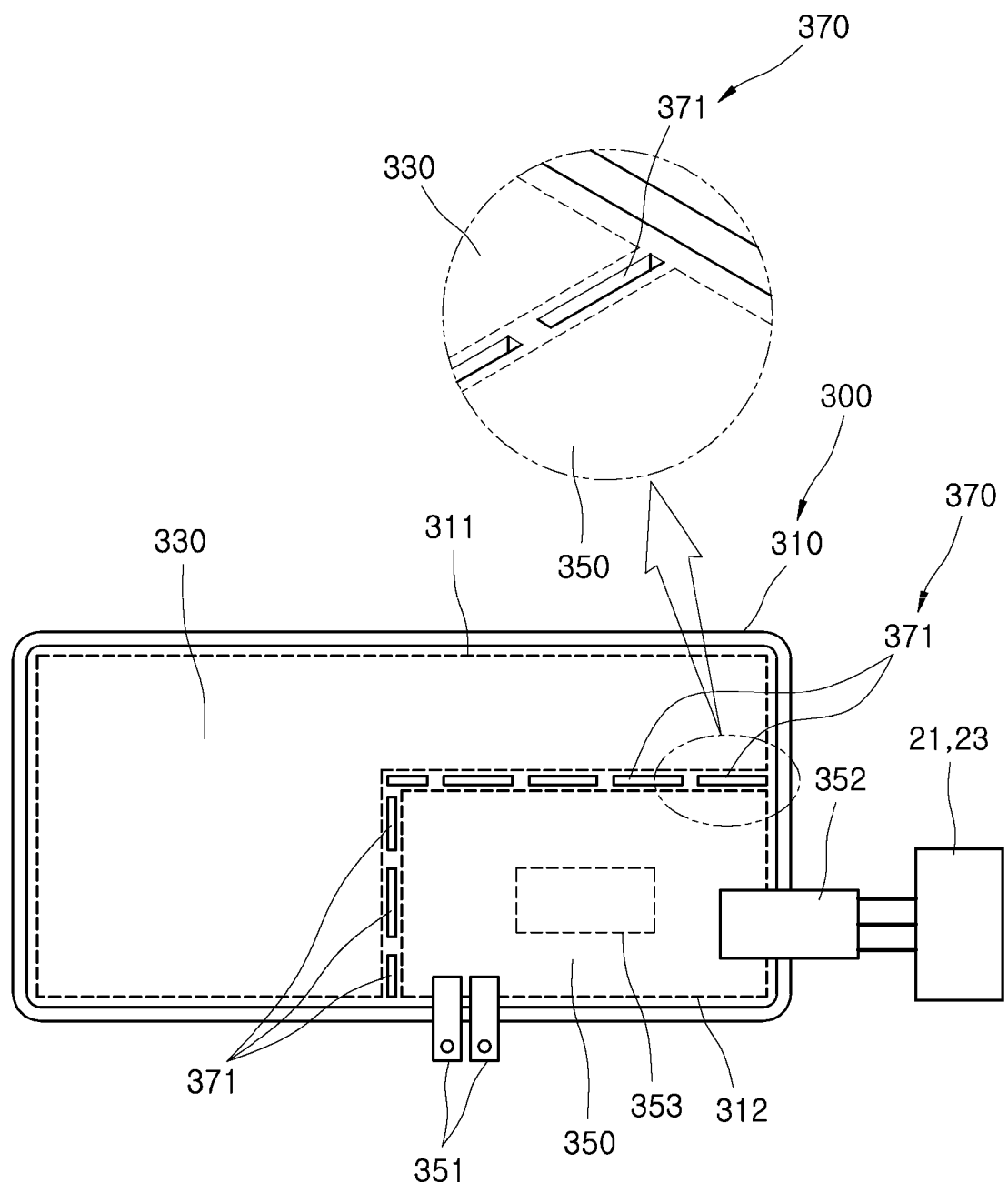
FIG. 4 is a view schematically illustrating a configuration of a control unit according to another embodiment of the present disclosure.
Figure 5:
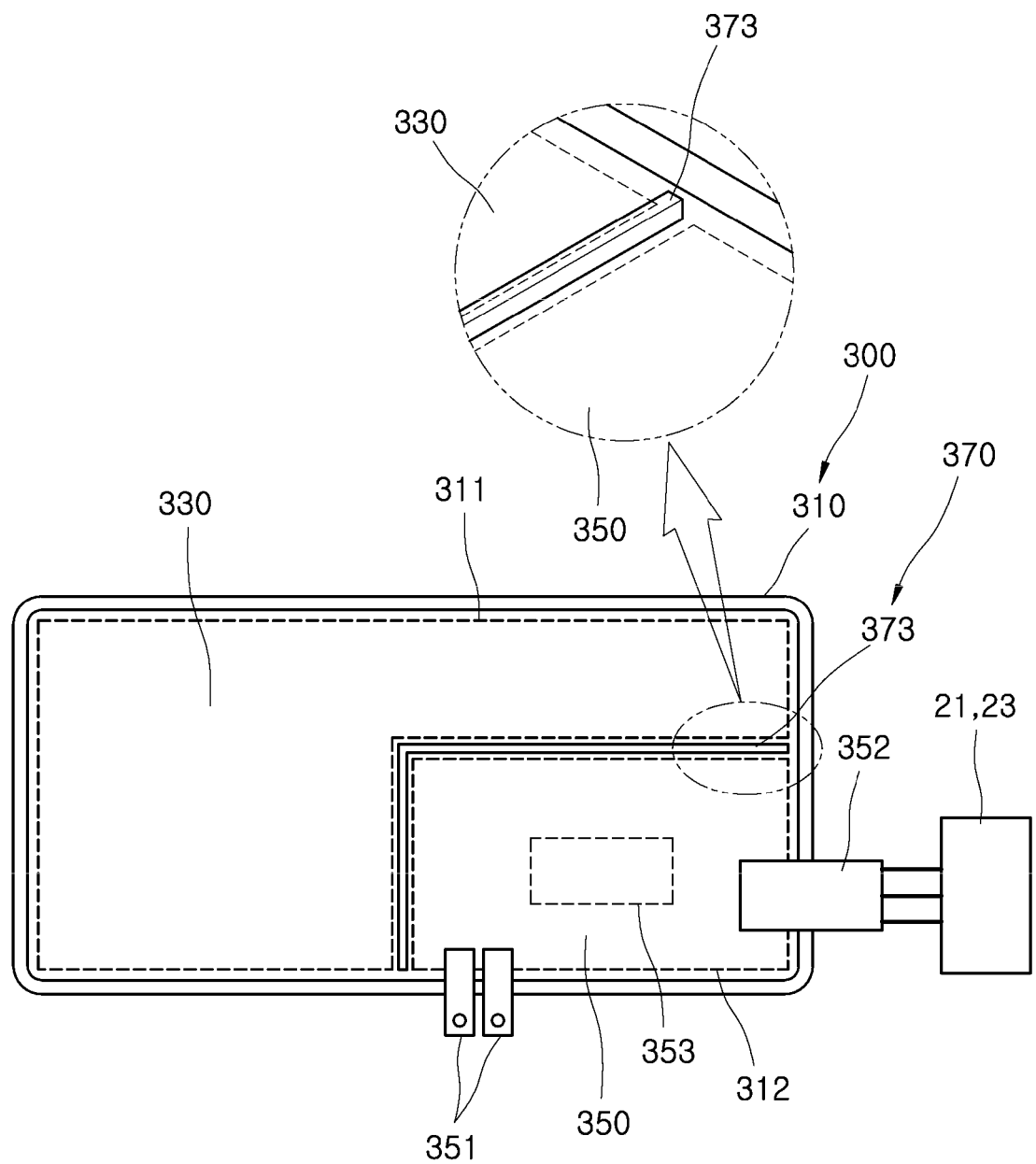
FIG. 5 is a view schematically illustrating a configuration of a control unit according to a further embodiment of the present disclosure.
Figure 6:
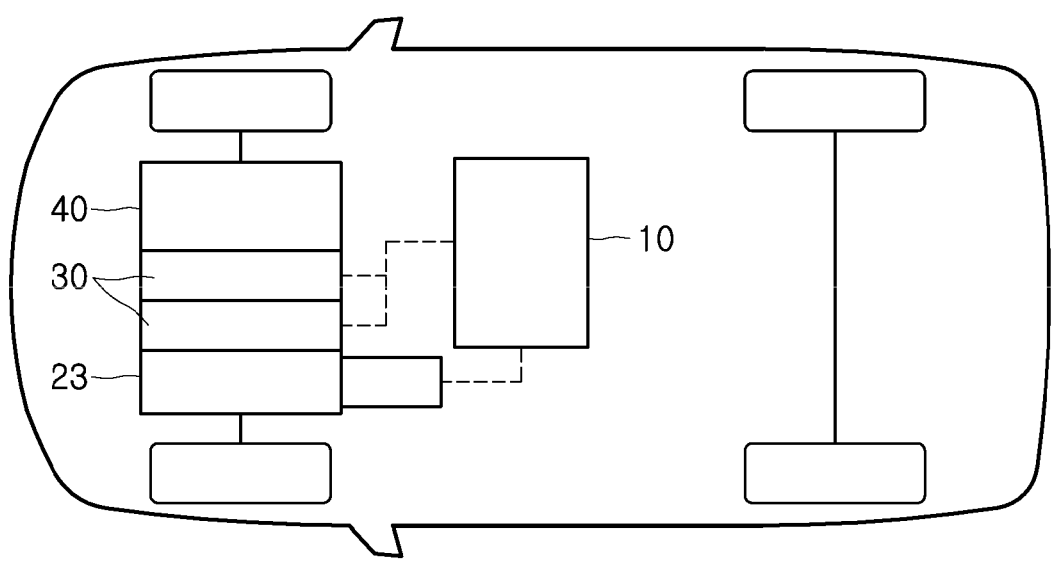
FIG. 6 is a view illustrating an example in which the power converter for integrated control of electric oil pumps according to the embodiment of the present disclosure is installed in a hybrid electric vehicle.
Figure 7:
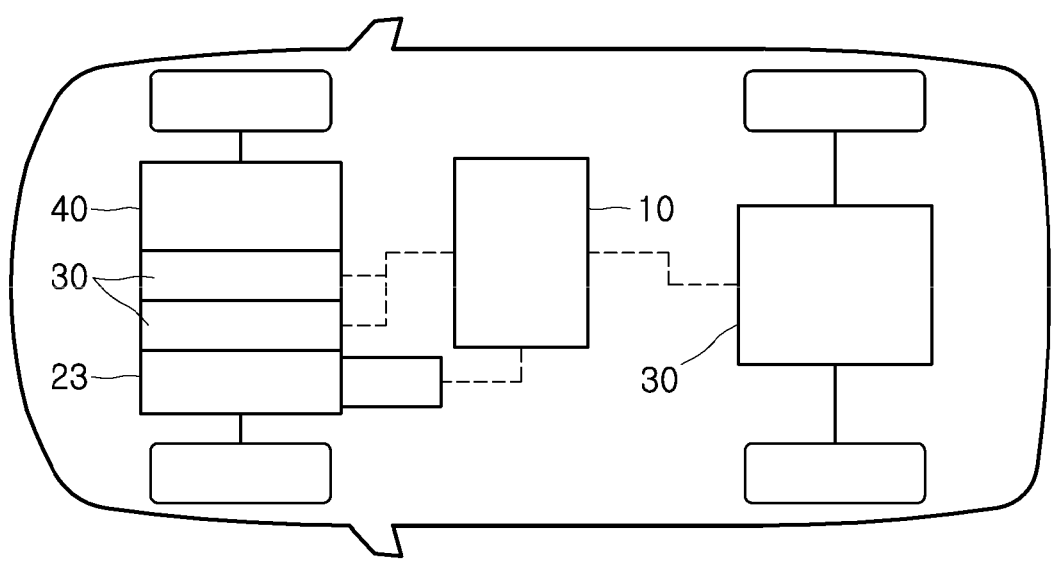
FIG. 7 is a view illustrating another example in which the power converter for integrated control of electric oil pumps according to the embodiment of the present disclosure is installed in a hybrid electric vehicle.

FIG. 2 is an exploded perspective view illustrating a power converter for integrated control of electric oil pumps according to an embodiment of the present disclosure. FIG. 3 is a view schematically illustrating a configuration of a control unit according to the embodiment of the present disclosure. FIG. 4 is a view schematically illustrating a configuration of a control unit according to another embodiment of the present disclosure. FIG. 5 is a view schematically illustrating a configuration of a control unit according to a further embodiment of the present disclosure. FIG. 6 is a view illustrating an example in which the power converter for integrated control of electric oil pumps according to the embodiment of the present disclosure is installed in a hybrid electric vehicle. FIG. 7 is a view illustrating another example in which the power converter for integrated control of electric oil pumps according to the embodiment of the present disclosure is installed in a hybrid electric vehicle.

Referring to FIGS. 2 to 7, the power converter for integrated control of electric oil pumps, which is designated by reference numeral 10, according to the embodiment of the present disclosure may include a power conversion module 200 and a control unit 300.

The power conversion module 200 may be provided to receive a direct current (DC) voltage, to convert the received DC voltage to an alternating current (AC) voltage, and to output the converted AC voltage to a drive motor.

For example, the power conversion module 200 may serve to receive DC power from a vehicle battery, which is a power source, and to convert the supplied DC power into AC power. Examples of the power converter 10 according to the embodiment of the present disclosure may include, but are not limited to, a hybrid power control unit (HPCU) configured by integrating an inverter and a controller in a package form, or an electronic power control unit (EPCU).

The power conversion module 200 may include a plurality of switching elements 210, examples of which may include an insulated gate bipolar transistor (IGBT). However, the switching elements 210 included in the power conversion module 200 are not limited thereto. For example, various semiconductor elements may be used as the switching elements.

The control unit 300 is provided to control the power conversion module 200 and to control the actuation of an oil pump that generates hydraulic pressure in a transmission. The control unit 300 and the power conversion module 200 may be physically separated and communicate with each other via connectors or wires.

Specifically, the control unit 300 may be provided to perform power supply control and signal control for the power conversion module 200. The control unit 300 according to the embodiment of the present disclosure may be provided to control the actuation of the oil pump that generates hydraulic pressure in the transmission, in addition to the existing role of controlling the power conversion module 200.

More specifically, the vehicle to which the embodiment of the present disclosure is applied may include an electronic oil pump (EOP) that generates hydraulic pressure to allow a lubrication and hydraulic system of the transmission to operate continuously. The electric oil pump may include an oil pump 21 and a pump motor 23. The actuation of the oil pump may be controlled by the control unit 300 of the power converter 10.

The control unit 300 may include a control board 310, a main controller 330, and an oil pump controller 350.

In the embodiment of the present disclosure, the power converter 10 may include a housing 110 with a predetermined space defined therein, and a cover 150 to cover the housing 110. The housing 110 may accommodate, in the internal space thereof, the components of the power converter 10, which may be covered by the cover 150. The control board 310 may be mounted in the housing 110 and covered by the cover 150.

The main controller 330 may be installed in a partial region of the control board 310, and be provided to supply power to the drive motor and to control the power conversion module 200. For example, the main controller 330 may include a circuit for controlling the power conversion module 200, and be connected to the power conversion module 200.

The oil pump controller 350 may be installed in a remaining region other than the partial region of the control board 310, and be connected to the main controller 330. The oil pump controller 350 may be provided to supply power to the pump motor for actuating the oil pump and to control the oil pump.

Specifically, the electric oil pump may include the oil pump and the pump motor as described above, and the oil pump controller 350 for controlling the pump motor may be included in the control unit 300 of the power converter. That is, the electric oil pump used in the present disclosure may be of a separate type in which the oil pump controller 350 is not integrally attached to the pump motor, in which case the oil pump controller 350 may be configured to be integrated into the control unit 300 in the power converter 10.

In the embodiment of the present disclosure, it is possible to increase the degree of freedom in package of the electric oil pump by integrating the oil pump controller for the electric oil pump into the control unit 300 of the power converter 10.

Specifically, the conventional electric oil pump (EOP) may be classified into a motor-attached-type electric oil pump in which an oil pump controller is attached to a pump motor and a motor-separated-type electric oil pump in which an oil pump controller is not attached to a pump motor. The motor-attached-type electric oil pump is disadvantageous in package configuration because of the volume of the oil pump controller. On the other hand, the motor-separated-type electric oil pump is advantageous in package configuration owing to free movement of the pump motor and oil pump, but may cause an increase in manufacturing cost due to the need for components such as a separate casing and bracket.

Accordingly, the embodiment of the present disclosure can be implemented to integrate the oil pump controller 350 for controlling the oil pump and the pump motor into the control unit 300 of the power converter 10, thereby eliminating a casing and application components required to mount the oil pump controller. As a result, the electric oil pump can have an increased degree of freedom in package since it is not restricted by the installation space thereof due to the size of the oil pump controller.

In addition, the present disclosure has an advantage of reducing the number of components as well as a reduction in cost and weight by eliminating the components required to mount the oil pump controller.

Moreover, according to the present disclosure, the output of the pump motor is directly controlled by the control unit 300 of the power converter 10, which can increase the precision of control, and the power converter 10 utilizes a water-cooled cooling system, which can improve the cooling efficiency of the oil pump.

Meanwhile, the oil pump controller 350 may include an input bus bar 351 and an output connector 352.

The input bus bar 351 may be electrically connected to the main controller 330 and installed on the control board 310 to receive DC power from the power source. For example, the power source may be a vehicle battery, and the input bus bar 351 may be directly or indirectly connected to the power source and the main controller 330 for supply of DC power.

The output connector 352 may be installed on the control board 310 to output AC power to the pump motor.

Specifically, the output connector 352 may output the AC power converted by the power conversion module 353 for the oil pump. For example, the output connector 352 is provided with a three-phase output terminal, and supplies the power to the pump motor 23 via cables.

Here, when in the control board 310, the region where the main controller 330 is installed is referred to as a first region 311 and the region where the oil pump controller 350 is installed is referred to as a second region 312, the input bus bar 351 and the output connector 352 may be installed in the second region 312.

Specifically, after the second region 312, which is a region for the oil pump controller 350, is separately configured in the control board 310 of the power converter 10, the input bus bar 351 may be directly mounted in the second region 312 where the oil pump controller 350 is installed to receive DC power. The power is then supplied to the pump motor 23 via the output connector 352 installed in the second region 312.

The main controller 330 may include at least one of a power stage and a signal stage to control the power conversion module 200, and may mainly serve to control signal processing. The oil pump controller 350 uses a high voltage to control the actuation of the oil pump and pump motor. Thus, a relatively low voltage may flow through the first region 311 whereas a relatively high voltage may flow through the second region 312. Therefore, in the present disclosure, the input bus bar 351 for carrying power input from the high-voltage battery and the output connector 352 for supplying power to the pump motor using high voltage may be positioned in the second region 312.

Here, the second region 312 may be a region including at least a portion of the edge of the control board 310.

That is, the second region 312 may be a region including the edge of the control board 310 instead of the central region thereof. For example, as in the illustrated embodiment, the second region 312 may be biased toward one corner of the control board 310. This allows the input bus bar 351 and the output connector 352 to be easily installed in the second region 312. However, the location of the second region is not limited to the illustrated embodiment. For example, various modifications are possible as long as the second region is a region including at least a portion of the edge of the control board.

Meanwhile, the control unit 300 may include an insulator 370.

The insulator 370 may be formed between the first region 311 and the second region 312 of the control board 310 to form a separation distance between the main controller 330 and the oil pump controller 350.

Specifically, a relatively low voltage flows through the first region 311 whereas a relatively high voltage flows through the second region 312, as described above. Therefore, the insulator 370 may be provided to insulate between the first region 311 and the second region 312. That is, the insulator 370 may ensure an insulation distance between the main controller 330 and the oil pump controller 350. As such, since the insulation distance is ensured between the first region 311 and the second region 312 on the control board, the possibility of dielectric breakdown can be minimized.

FIG. 4 schematically illustrates a configuration of a control unit 300 according to another embodiment of the present disclosure, and an insulator 370 of the control unit 300. FIG. 5 schematically illustrates a configuration of a control unit 300 according to a further embodiment of the present disclosure, and an insulator 370 of the control unit 300.

Referring to FIG. 4, the insulator 370 may include a plurality of insulation holes 371 formed between a main controller 330 and an oil pump controller 350 and elongated along a boundary between a first region 311 and a second region 312.

Specifically, the insulation holes 371 may be spaced apart from one another along the boundary between the first region 311 and the second region 312. Here, the number and size of the insulation holes 371 may be determined in consideration of an installation environment such as the difference in voltage or the size of the control board 310. The insulation holes 371 may ensure an insulation distance between the main controller 330 and the oil pump controller 350.

Referring to FIG. 5, the insulator 370 may include an insulation barrier 373 protruding between a main controller 330 and an oil pump controller 350 and having a predetermined thickness.

For example, the insulation barrier 373 may be formed continuously along a boundary between a first region 311 and a second region 312. In addition, the insulation barrier 373 may protrude perpendicular to one surface of the control board 310. The insulation barrier 373 formed between the first region 311 and the second region 312 may ensure an insulation distance between the main controller 330 and the oil pump controller 350.

As such, since the insulator 370 is implemented as the insulation holes 371 or the insulation barrier 373, the insulation distance can be ensured between the main controller 330 and the oil pump controller 350 to effectively dissipate heat and thus reduce the possibility of dielectric breakdown. In addition, it is possible to reduce manufacturing costs since the process of forming the insulation holes 371 and the insulation barrier 373 is simple.

According to the embodiments of the present disclosure, integrating the oil pump controller for the electric oil pump into the control unit of the power converter can increase the degree of freedom in package of the electric oil pump.

FIGS. 6 and 7 illustrate examples in which the power converter for integrated control of electric oil pumps according to the embodiment of the present disclosure is installed in a hybrid electric vehicle (HEV).

Referring to the illustrated examples, the power converter according to the present disclosure may perform integrated control of a total of n+1 motors, including n drive motors using AC power and a pump motor 23 of an electric oil pump (EOP).

For example, referring to FIG. 6, the control unit of the power converter 10 may control two front-wheel drive motors 30 and one pump motor 23. For example, referring to FIG. 7, for a vehicle with a rear-wheel drive motor in addition to front-wheel drive motors, the power converter 10 may control three drive motors and one pump motor. An unexplained reference numeral 40 denotes an engine. This may increase the packageability of the vehicle.

In addition, the present disclosure has an advantage of reducing the number of components as well as a reduction in cost and weight by eliminating the components required to mount the oil pump controller.

Moreover, in the present disclosure, the output of the pump motor is directly controlled by the control unit of the power converter, which can increase the precision of control, and the power converter utilizes a water-cooled cooling system, which can improve the cooling efficiency of the oil pump.

Although the specific embodiments of the present disclosure have been described above, the spirit and scope of the present disclosure are not limited to these specific embodiments. It will be understood by those skilled in the art that various modifications and variations may be made without departing from the subject matter of the present disclosure as defined in the following claims.

What is claimed is:

1. A power converter for integrated control of electric oil pumps, comprising:
   a power conversion module configured to receive direct current (DC) power to convert the DC power into alternating current (AC) power and to output the converted AC power to a drive motor; and
   a control unit configured to control the power conversion module and to control actuation of an oil pump for generating hydraulic pressure in a transmission, wherein the control unit comprises:
   a control board;
   a main controller installed in a partial region of the control board to supply power to the drive motor and to control the power conversion module; and
   an oil pump controller installed in a remaining region other than the partial region, connected to the main controller, and configured to supply power to a pump motor for actuating the oil pump and to control the oil pump.

2. The power converter according to claim 1, wherein the oil pump controller comprises:
   an input bus bar electrically connected to the main controller and installed on the control board to receive DC power from a power source; and
   an output connector installed on the control board to output AC power to the pump motor, and
   wherein, when in the control board, the region where the main controller is installed is referred to as a first region and the region where the oil pump controller is installed is referred to as a second region, the input bus bar and the output connector are installed in the second region.

3. The power converter according to claim 2, wherein the second region is a region comprising at least a portion of an edge of the control board.

4. The power converter according to claim 2, wherein the control unit further comprises an insulator formed between the first region and the second region of the control board to form a separation distance between the main controller and the oil pump controller.

5. The power converter according to claim 4, wherein the insulator comprises a plurality of insulation holes formed between the main controller and the oil pump controller and elongated along a boundary between the first region and the second region.

6. The power converter according to claim 4, wherein the insulator comprises an insulation barrier protruding between the main controller and the oil pump controller and having a predetermined thickness.

* * * * *